Inventor
BERTHOLD P. PINKVOSS

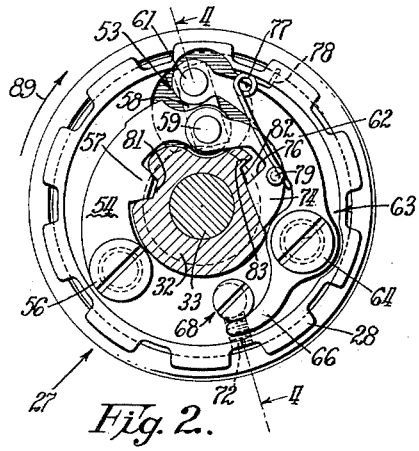
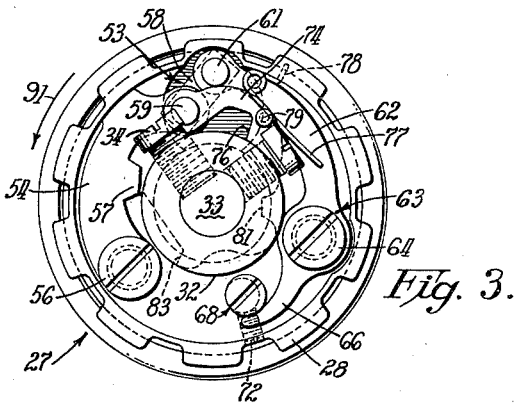
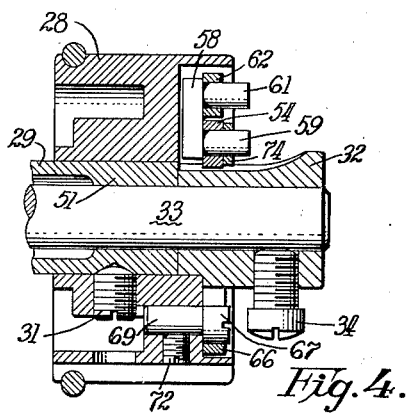
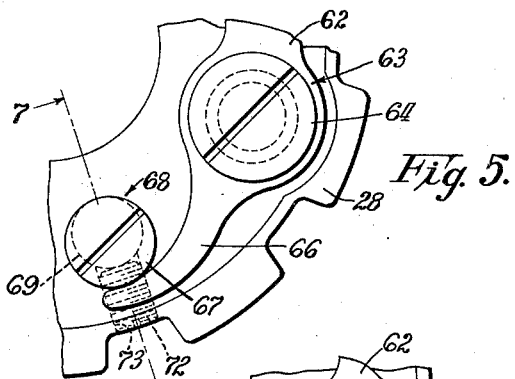
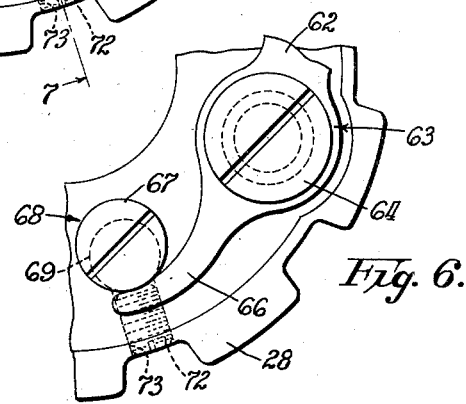
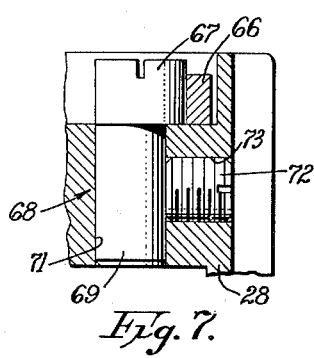

Patented Apr. 25, 1950

2,505,742

UNITED STATES PATENT OFFICE 2,505,742

OVERLOAD RELEASE CLUTCH

Berthold P. Pinkvoss, Stratford, Conn., assignor to The Singer Manufacturing Company, Elizabeth, N. J., a corporation of New Jersey Application May 4, 1946, Serial No. 667,265

4 Claims. (Cl. 192—56)

This invention relates to overload release clutches, and more particularly to a type of clutch that is especially adapted, though not necessarily restricted, for use in a high speed sewing machine similar to the one disclosed in a United States patent application, Serial No. 641,233, filed January 15, 1946, now Patent Number 2,425,120 by Frank Parry and Berthold P. Pinkvoss.

Overload release clutches have been used extensively for disconnecting the rotary hook from the main drive when the rotary hook becomes jammed or inoperative, thereby to prevent breakage of sewing machine parts. A clutch of this type is disclosed in the United States patent of W. A. Andres, No. 1,914,795, June 20, 1933. In prior constructions, little consideration had been given to producing a clutch with a spring that could be adjusted with the optimum ease and accuracy. Furthermore, the prior art indicates that no consideration had been given to providing a low inertia overload release clutch suitable for use in present day high speed sewing machines which are subjected to periods of rapid acceleration and deceleration.

Therefore, one object of the present invention is to provide a new and improved overload release clutch having a spring that can be adjusted easily and accurately.

Another object of the invention is to provide a new and improved low inertia overload release clutch that is especially adapted for use in high speed sewing machines.

Further important objects of the invention will be apparent from the following detailed description and appended claims.

For a complete understanding of the invention, reference should be made to the accompanying drawings, wherein:

Fig. 2 is a view taken along the line 2—2 of Fig. 1 and looking in the direction of the arrows; the members being rotated from the position shown in Fig. 1.

Fig. 3 is a view taken along the line 3—3 of Fig. 1 and looking in the direction of the arrows, the clutch members being disengaged and rotated from that shown in Fig. 1.

Fig. 4 is a sectional view taken substantially along the line 4—4 of Fig. 2, and looking in the direction of the arrows;

Fig. 5 is an enlarged view of a portion of the mechanism shown in Fig. 2;

Fig. 6 is a view similar to Fig. 5, but showing parts differently adjusted; and

Fig. 7 is a sectional view taken substantially along the line 7—7 of Fig. 5.

Figure 1:
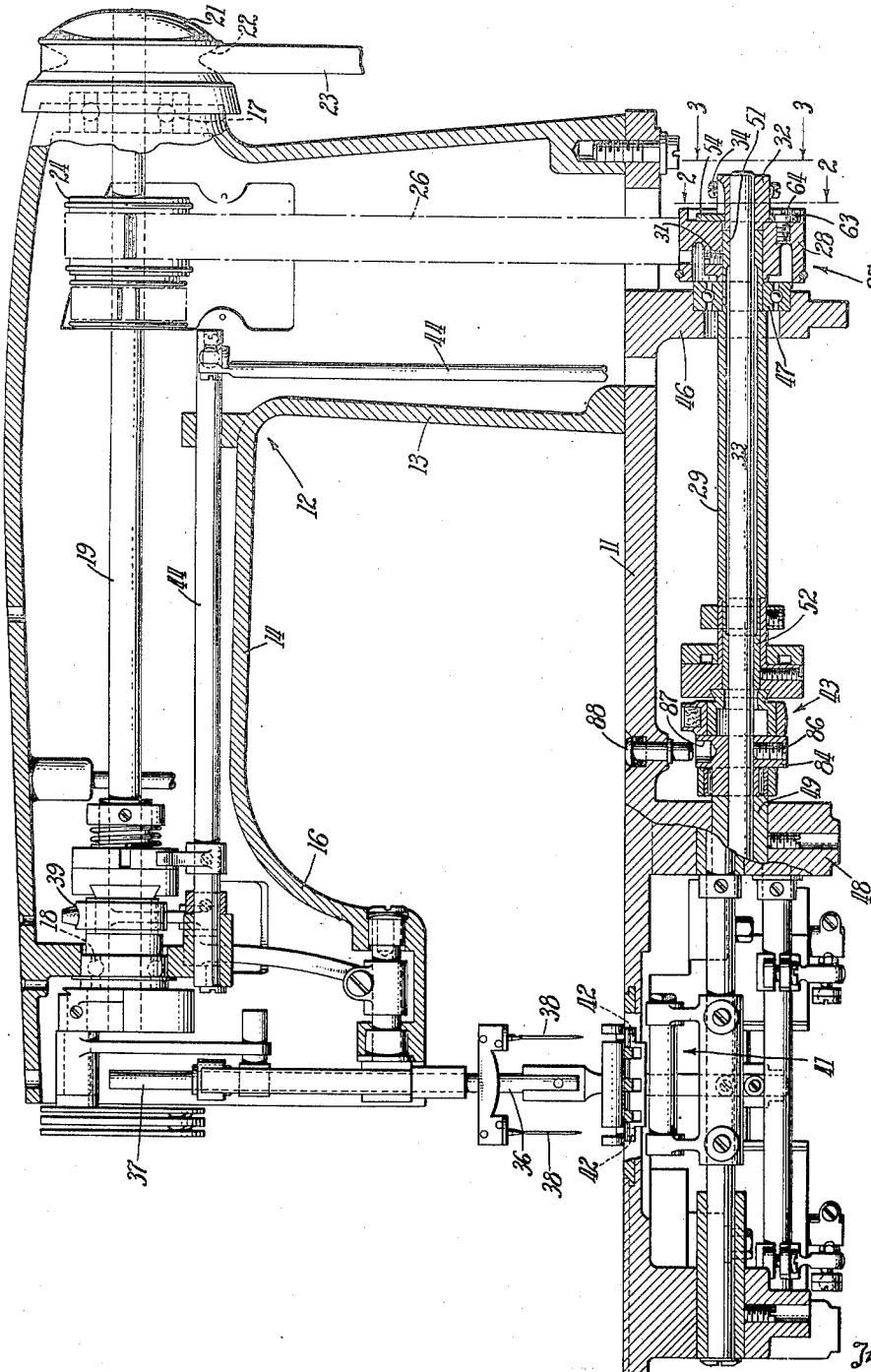
Fig. 1 is a longitudinal vertical sectional view of a high speed sewing machine embodying the present invention.

Referring more specifically to the drawings, the invention is disclosed as applying to a sewing machine having a frame comprising a bed 11 and a bracket-arm 12, the latter having a vertically disposed standard 13, supported by the bed 11, and a horizontally disposed overhanging arm 14, carried on the upper end of the standard 13. The left end of the arm 14 is formed into a bracket-arm head 16.

A pair of bearings 17 and 18, positioned in opposite ends of the arm 14, rotatably supports a horizontally disposed needle-bar actuating shaft 19. The shaft 19 carries, at its right end (Fig. 1), a combination belt and hand wheel 21 which has a V-shaped annular groove 22 adapted to receive a driving belt 23. The left end of the shaft drives hereinafter mentioned mechanisms that are carried in the bracket-arm head 16. The shaft 19, at a point intermediate of its ends and above the standard 13, carries a small diameter low inertia pulley 24 which through a clip belt 26 drives, in one-to-one ratio, a small diameter low inertia overload release clutch 27. A driving-pulley element 28 of the clutch 27 drives a rotatable sleeve 29, being secured thereto by set screws 31. A driven hub-element 32 of the clutch 27 drives a rotatable shaft 33, being secured thereto by set screws 34 (Fig. 4). The elements 28 and 32 are coaxially positioned with respect to one another, and are releasably connected for unison rotation. The shaft 33 is concentrically carried within the sleeve 29, and the two are supported in a manner hereinafter described.

The mechanisms supported in the bracket-arm head 16 include a spring pressed presser-bar 36 and a reciprocatory, vibratory needle-bar 37 having a pair of needles 38. Mechanism for reciprocating and vibrating the needle-bar, as well as an upper eccentric mechanism 39 for varying the vibratory movement of the needle-bar 37, is driven from the hereinbefore mentioned shaft 19. A pair of loop-takers (not shown) and a four motioned lower feeding mechanism 41 are housed below the bed 11. The loop-takers may be of any one of several known types and are driven at a two-to-one ratio from the shaft 33 by a pair of gears (not shown). The feeding mechanism, which has a pair of needle openings 42, is driven through an adjustable eccentric mechanism 43 from the sleeve 29. A means for simultaneously and synchronously varying the eccentricity of the upper eccentric mechanism 39 and the lower feed-drive eccentric 43 is designated by the numeral 44. It will be understood that the movement of the feeding mechanism 41 and its needle openings 42 will always be maintained in synchronism with the vibratory movement of the needle-bar 37 and the needles 38. It will also be understood that under normal operating conditions the loop-takers (not shown) will cooperate with the needles 38 to form two lines of stitches.

A lug 46 depending from the bed 11 supports the outer race ring of a ball bearing 47, the inner race ring of which rotatably supports the right end (Fig. 1) of the sleeve 29. A second lug 48 also depending from the bed 11 carries a bearing bushing 49 which rotatably supports the shaft 33. The right end of the sleeve 29 rotatably supports the right end of the shaft 33 by means of a bearing portion 51, and the sleeve 29 is rotatably supported on the shaft 33 by a bearing portion 52.

As hereinbefore mentioned, the pulley element 28 of the clutch 27 is secured to and rotates with the sleeve 29. The right face of this element carries a toggle joint 53 (Figs. 2 and 3) having an arcuate link 54 which is pivotally held in place by a screw 56. Intermediate the ends of the link 54 a wedge-shaped projection 57 extends inwardly from the concave side of the link. The link 54 is pivotally connected to one end of a toggle-link 58 by a pin 59, whereas the other end of the toggle-link 58 carries a pin 61, to which is pivotally connected one end of a first arm 62 of a bow spring 63. The two-armed bow spring 63 is fulcrumed at a point intermediate of its ends on a pin or screw 64. In the embodiment illustrated, the fulcrum pin or screw 64 is threaded into and projects from the side face of pulley element 28. A second arm 66 of the bow spring extends beyond the screw 64 and is engaged by a head 67 of a pin 68, the pin being located on the inner side of said arm 66, at a point substantially diametrically opposite the pin 61. In other words the bow spring 63 is semicircular in form and substantially embraces the driven element 32. The head 67 is eccentrically formed as an integral part of a stem 69 which is disposed for turning adjustment in a hole 71 provided in the pulley element 28. A set screw 72 may be screwed into or out of a threaded hole 73 thereby to engage or disengage the stem 69.

A pawl 74 is pivotally mounted on the pin 59 and has a hooked portion 76. One end of a coiled spring 77 is supported in a hole 78 formed in the clutch element 28. The other end of the spring engages a pin 79 carried by the pawl 74 and the spring thereby biases the pawl toward the hub 32. The periphery of the driven clutch element 32 is provided with two recesses 81 and 82. The recess 81 is wedge shaped and is designed for engagement by the wedge-shaped projection 57 of the link 54. The second recess 82 is provided with a shoulder 83 for engagement by the hooked portion 76 of the pawl 74.

In order to prevent turning of the shaft 33 and its driven clutch element 32 when performing an operation hereinafter described, there is provided a disk 84 (Fig. 1) which is secured to the shaft 33 by a set screw 86. A hole 87, provided in the periphery of the disk, may be engaged by a manually operated and spring retracted pin 88 that is carried by the bed 11.

In operation, the hereinbefore described pulley element 28 of the clutch 27 and therefore the sleeve 29 are driven in a clockwise direction as indicated by the arrow 89 of Fig. 2. Under normal conditions the hub 32 and therefore the shaft 33 are likewise driven in a clockwise direction due to the engagement of the projection 57 with the recess 81. When, however, an excessive load is applied to the shaft 33, the wedge-shaped projection 57 is forced out of the recess 81 and, due to a slight reverse bending of the toggle, the wedge-shaped projection 57 of the link 54 is moved and held in a position (Fig. 3) out of contact with the hub 32. Then, due to the spring 77, the free end of the pawl 74 is caused to ride freely over the periphery of the hub 32 in a clockwise direction as long as the driving element 28 overruns the driven element 32.

When it is desired to re-establish driving relation between the driving member 28 and the hub 32, the operator stops the sewing machine and depresses the pin 88. Then, by manual operation of the hand wheel 21, the clutch element 28 and thus the pawl 74 are rotated in a counter-clockwise direction (arrow 91, Fig. 3) until the hook portion 76 of the pawl engages the shoulder 83 on the driven element 28. This causes the shaft 33 to rotate until it is stopped by pin 88 entering hole 87. Further movement of the hand wheel 21 and the element 28 applies force to the pin 59 and breaks the toggle thereby causing the projection 57 to enter the recess 81.

In the event that it becomes desirable to regulate the stress under which the projection 57 will be forced out of the recess 81, it is simply necessary to adjust the biasing effect of the bow spring 63 by turning adjustment of the eccentric pin 68. Turning of the pin to one position (Fig. 5) moves the eccentric and the arm 66 away from the center of the clutch element 28 and thereby tightens the spring and the toggle; whereas turning of the pin 68 to another position (Fig. 6) allows the arm 66 to move toward the center of the clutch element 28 and thereby decreases the effect of the bow spring 63. The eccentric pin 68 is held in any desired adjusted position by means of the set screw 72.

Due to the novel shape, positioning and arrangement of parts hereinbefore described, this invention has provided an easily adjustable overload release clutch of small diameter and low inertia. Overload release clutches having these characteristics have been found to be especially useful for use with modern type high speed sewing machines.

Having thus set forth the nature of the invention, what I claim herein is:

1. An overload release clutch having a rotatable driving element, a rotatable driven element, means for connecting said elements comprising members pivoted to form a toggle joint, a bow spring having two resilient arms, a fulcrum pin for pivotally mounting said bow spring and located intermediate said two arms, and a spring adjusting mechanism; one of said arms of the bow spring being pivotally connected to one of said toggle members and the other of said arms being engaged by the spring adjusting mechanism at a point remote from said fulcrum pin.

2. An overload release clutch having a rotatable driving element, a rotatable driven element, members pivoted to form a toggle joint, a projection carried by at least one of said elements, and the other of said elements being provided with a recess arranged for engagement by said projection and thereby connecting said elements, a bow spring having two resilient arms, an adjustable eccentric pin, and means for holding said pin in an adjusted position; one of said arms of said bow spring being pivotally connected to one of said toggle members, and the other of said arms being engaged by the eccentric pin.

3. An overload release clutch having a rotatable driving element, a rotatable driven element, means for connecting said elements comprising members pivoted to form a toggle joint, a resilient bow spring semicircular in form and substantially embracing one of said elements, a fulcrum pin for pivotally mounting said bow spring and located intermediate the two ends of said spring and thereby defining two resilient arms, and an eccentric adjusting mechanism; one of said resilient arms being connected to said toggle joint and the other of said resilient arms being engaged by said eccentric mechanism at a point remote from said fulcrum pin.

4. An overload release clutch having a rotatable driving element, a rotatable driven element, a separable connection between said driving element and said driven element, and means for adjustably biasing said connection; said means for adjustably biasing said connection, comprising, a resilient bow spring semicircular in form and having an inner concave side adjacent and substantially embracing one of said elements, one end of said bow spring being linked to a portion of said separable connection; and an eccentric pin so constructed and arranged as to adjustably engage the inner concave side of the other end of said bow spring.

BERTHOLD P. PINKVOSS.

REFERENCES CITED

The following references are of record in the file of this patent:

UNITED STATES PATENTS

| Number | Name | Date |
| --- | --- | --- |
| 1,914,795 | Andres | June 30, 1933 |
| 2,003,115 | Grohn | May 28, 1935 |
| 2,256,781 | Nelson | Sept. 23, 1941 |